United States Patent
Toide et al.

[11] Patent Number: 5,135,300
[45] Date of Patent: Aug. 4, 1992

[54] PROJECTION COLOR DISPLAY APPARATUS

[75] Inventors: Eiichi Toide; Shinsuke Shikama; Mitsushige Kondo; Hiroshi Kida; Masahiro Usui, all of Nagaokakyo, Japan

[73] Assignee: Mitsubishi Denki Kabushiki Kaisha, Tokyo, Japan

[21] Appl. No.: 645,631

[22] Filed: Jan. 25, 1991

[30] Foreign Application Priority Data

Feb. 1, 1990 [JP] Japan .................................. 2-22767
May 16, 1990 [JP] Japan ................................ 2-127688
May 16, 1990 [JP] Japan ................................ 2-127689

[51] Int. Cl.[5] ........................................... G03B 21/28
[52] U.S. Cl. ........................................ 353/31; 353/33; 353/34; 353/94; 353/81; 353/20; 359/48; 358/253
[58] Field of Search ................ 353/31, 30, 33, 34, 353/37, 81, 94, 20, 122, 84; 358/253, 250, 242; 359/48, 66, 580, 581, 589

[56] References Cited

U.S. PATENT DOCUMENTS

| | | | |
|---|---|---|---|
| 4,633,131 | 12/1986 | Khurgin | 358/253 |
| 4,634,926 | 1/1987 | Vriens et al. | 358/253 |
| 4,647,812 | 3/1987 | Vriens et al. | 358/253 |
| 4,748,546 | 5/1988 | Ukrainsky | 350/345 |
| 4,804,884 | 2/1989 | Vriens et al. | 358/253 |
| 4,882,617 | 11/1989 | Vriens | 350/345 |
| 4,896,218 | 1/1990 | Vick | 358/253 |
| 4,920,298 | 4/1990 | Hirotani et al. | 350/345 |
| 4,950,053 | 8/1990 | Haim et al. | 350/345 |
| 4,971,436 | 11/1990 | Aoki et al. | 353/31 |
| 4,990,824 | 2/1991 | Vriens et al. | 358/253 |
| 4,995,718 | 2/1981 | Jachimowicz et al. | 353/31 |

*Primary Examiner*—William A. Cuchlinski, Jr.
*Assistant Examiner*—William C. Dowling

[57] ABSTRACT

Three light fluxes are modulated by corresponding light valves so as to project a color image on a screen. An interference filter for selectively transmitting a light flux which is emitted in a direction perpendicular to a light emitting surface of the interference filter is disposed on the light-emitting portion so as to increase the intensity of light fluxes which are emitted in the forward direction. A light-flux-emitting portion of a light source and the light valve have approximately the same configuration so that the intensity of the light fluxes to be projected on the light valves is increased.

54 Claims, 10 Drawing Sheets

FIG.4A  FIG.4B
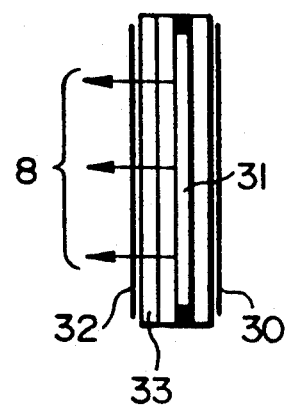
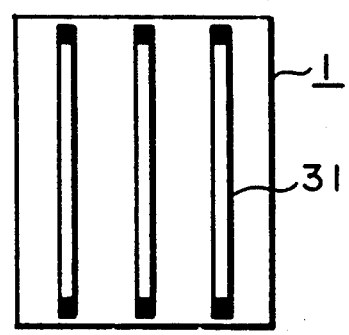
FIG.5A  FIG.5B
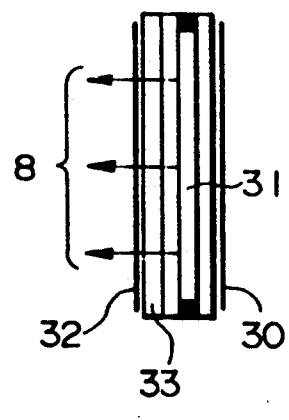
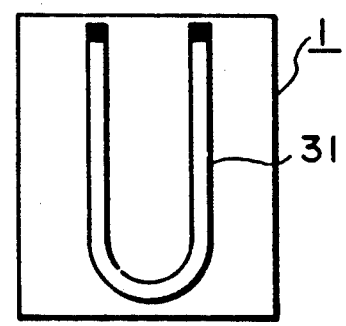

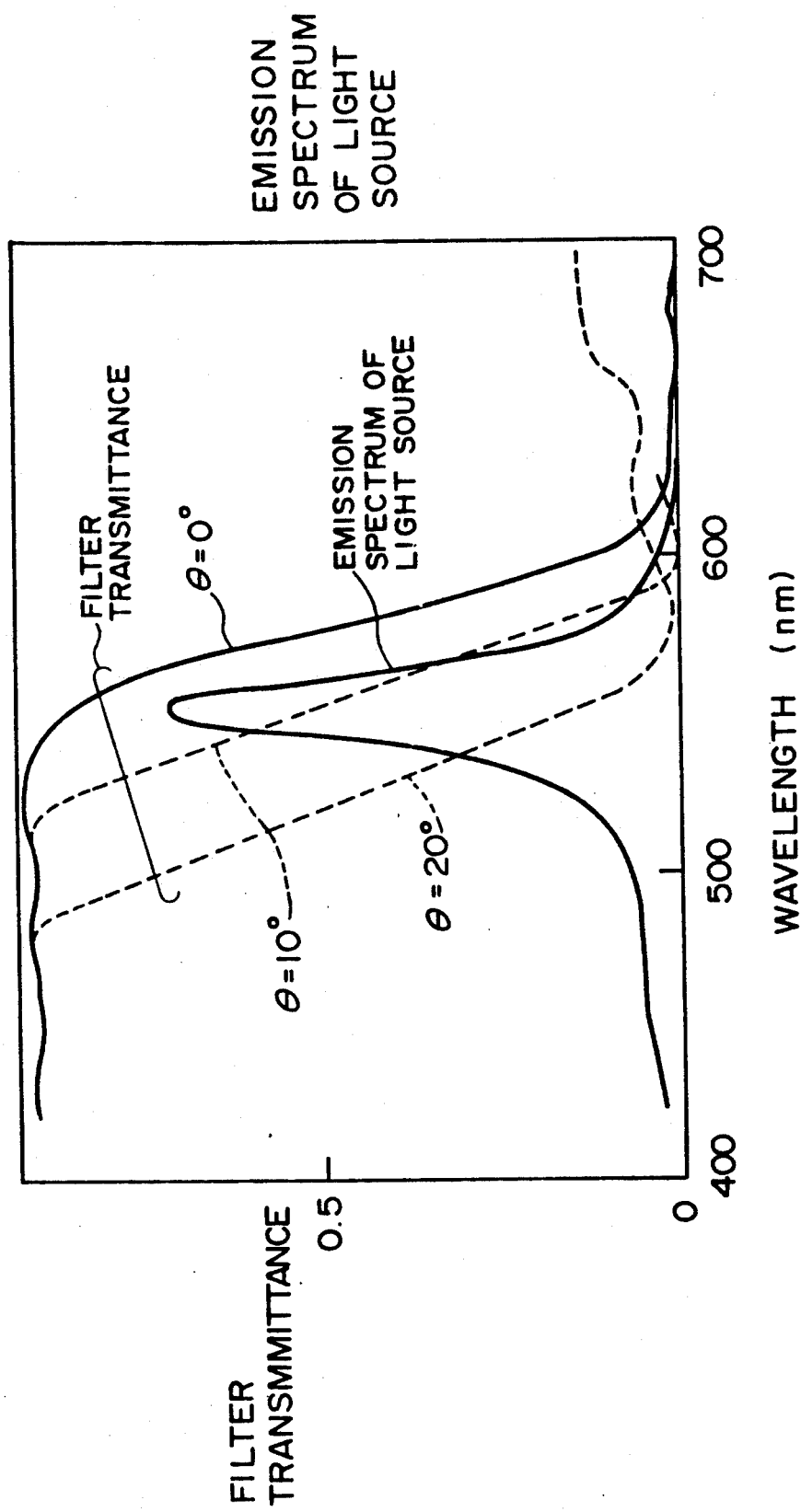

PROJECTION COLOR DISPLAY APPARATUS

BACKGROUND OF THE INVENTION

1. Field of the Invention

The present invention relates to a projection color display apparatus which uses a plurality of light valves for forming an image.

2. Description of the Related Art

FIG. 1 schematically shows the structure of a conventional projection color display apparatus, and FIG. 2 is an enlarged partially sectional view of the structure of a part of a light source portion 1 of the apparatus. The light source portion 1 is composed of a white light source 2 such as a metal-halide lamp and a parabolic reflecting mirror 3 with a concave surface for converting the light flux emitted from the light source 2 into an approximately parallel light flux. The light source 2 has a discharge electrode 4 which is connected to a power source 5. The discharge electrode 4 is supported by a transparent outer wall 6 made of, for example, silica glass, and light is emitted from a light-emitting portion 7. The light source 2 is disposed such that the light-emitting portion 7 is situated in the vicinity of the focal point of the parabolic reflecting mirror 3.

From the light source portion 1, a light flux 8 having a circular section is emitted. A dichroic mirror 9 which has a wavelength selectivity for reflecting a red light flux 13R in the approximately orthogonal direction and transmitting a mixed light flux 10 of blue and green light fluxes is provided in the path for the light flux 8. In the path for the red light flux 13R, a reflecting mirror 11 is provided which reflects the red light flux 13R approximately orthogonally to the direction of the progress as a light flux 14R. In the path for the light flux 10, a dichroic mirror 12 is provided which has a wavelength selectivity for reflecting a blue light flux 14B in the approximately orthogonal direction and transmitting a green light flux 14G. In the paths for the light fluxes 14R, 14B and 14G, transmission light valves 15R, 15B and 15G are respectively provided so as to two-dimensionally modulate the light intensity in the planes which are orthogonal to the optical paths. Each of these light valves is constituted by an image display panel which utilizes, for example, an electrooptic effect of a liquid crystal for modulating a transmittance. The light valves 15R, 15B and 15G are driven in accordance with TV signals or the like, display TV images or the like and spatially modulate the intensity (sectional intensity) of the transmitted light which are emitted from the light valves. The size of each of the light valves is for example, 1 to 5 inches.

In this way, light fluxes 14R, 14B and 14G with the respective sectional intensities two-dimensionally modulated are emitted from the light valves 15R, 15B and 15G as light fluxes 16R, 16B and 16G, respectively. In the path for the light flux 16G, a reflecting mirror 17 is provided which reflects the light flux 16G approximately orthogonally to the direction of progress as a light flux 18G. A dichroic mirror 19 transmits the light flux 16R and reflects the light flux 16B approximately orthogonally to the direction of progress, thereby forming a light flux 20 which is a mixture of the light flux 16R and the light flux 16B. A dichroic mirror 21 transmits the light flux 20 and reflects the light flux 18G approximately orthogonally to the direction of progress, thereby forming a light flux 22 which is a mixture of the light flux 20 and the light flux 18G. The light flux 22 is a mixture of red, blue and green light fluxes with the respective intensities modulated by the light valves 15. A projection lens 23 projects the light flux 22 onto a screen 24 so that the real images of the images on the light valves 15R, 15B and 15G are projected on the screen 24 as an enlarged image. The size of the screen used is, for example, about 20 to 200 inches. The light valves 15R, 15B and 15G are disposed at an equal distance (optical path length) from the projection lens 23. The dichroic mirror utilizes the optical interference by a thin film and only reflects the light having a specific wavelength while transmitting the light of the other wavelengths.

The operation of the conventional apparatus will now be explained.

The light flux emitted from the white light source 2 is reflected by the parabolic reflecting mirror 3 with a concave surface as an approximately parallel light flux and converted into red, blue and green approximately parallel light fluxes 14R, 14B and 14G by the dichroic mirrors 9 and 12. The intensities of the red, blue and green light fluxes 14R, 14B and 14G are two-dimensionally modulated by the light valves 15R, 15B and 15G, respectively. The images on the light valves are enlarged and formed on the screen 24 by the projection lens 23, thereby forming an enlarged TV image or the like.

The light source portion of a conventional projection color display apparatus uses a parabolic reflecting mirror having a concave surface so as to converge the light flux emitted from the light source with efficiency and to obtain parallel rays. In order to enhance the utilization efficiency of the light flux emitted from the light source in the converging system, the light source is preferably as close to a point source as possible. If a metal-halide lamp is used as a light source, such a desirable condition is obtained by shortening the discharge gap length. However, when the discharge gap length is shortened, the making power per unit volume must be increased so as to obtain the same emission power, thereby shortening the life of the metal halide lamp. A light source which is as close to a point source as possible and which has a sufficient life necessary for the apparatus has been conventionally designed and developed.

For this reason, a light source with the light-emitting portion having a certain length (e.g., 5 mm) is conventionally used as the light source. The light emitting source of a conventional projection color display apparatus, however, is disadvantageous in that since it uses such a light source, it is impossible to obtain completely parallel rays from the parabolic reflecting mirror having a concave surface. Therefore, the light which is deviated from the parallel rays is diffused on the way from the light source to the light valves, thereby making it impossible to obtain sufficient luminance on the screen.

As described above, the utilization efficiency of light fluxes is incompatible with the life of a conventional projection display apparatus, and it is impossible to realize an ideal point source.

SUMMARY OF THE INVENTION

Accordingly, it is an object of the present invention to eliminate the above-described problems in the prior art and to provide a projection color display apparatus which is capable of enhancing the utilization efficiency of the light flux emitted from the light source.

To achieve this aim, in a projection color display apparatus according to the present invention, the light-emitting portion of the light source has a flat shape, and the light-emitting surface is provided with an optical interference filter so as to only transmit light fluxes which enter substantially perpendicularly to the light having a specific wavelength.

The above and other objects, features and advantages of the present invention will become clear from the following description of preferred embodiments thereof, taken in conjunction with the accompanying drawings.

BRIEF DESCRIPTION OF THE DRAWINGS

FIG. 4(a) is a side elevational view and FIG. 4(b) is a front elevational view showing the structure of an example of a light source portion in the embodiment shown in FIG. 3;

FIG. 5(a) is a side elevational view and FIG. 5(b) is a front elevational view showing the structure of another example of a light source portion in the embodiment shown in FIG. 3;

FIG. 6 shows the spectral characteristics of the optical interference filter in the embodiment shown in FIG. 3;

DESCRIPTION OF THE PREFERRED EMBODIMENT

Embodiments of the present invention will be explained hereinunder with reference to the accompanying drawings.

Figure 1:
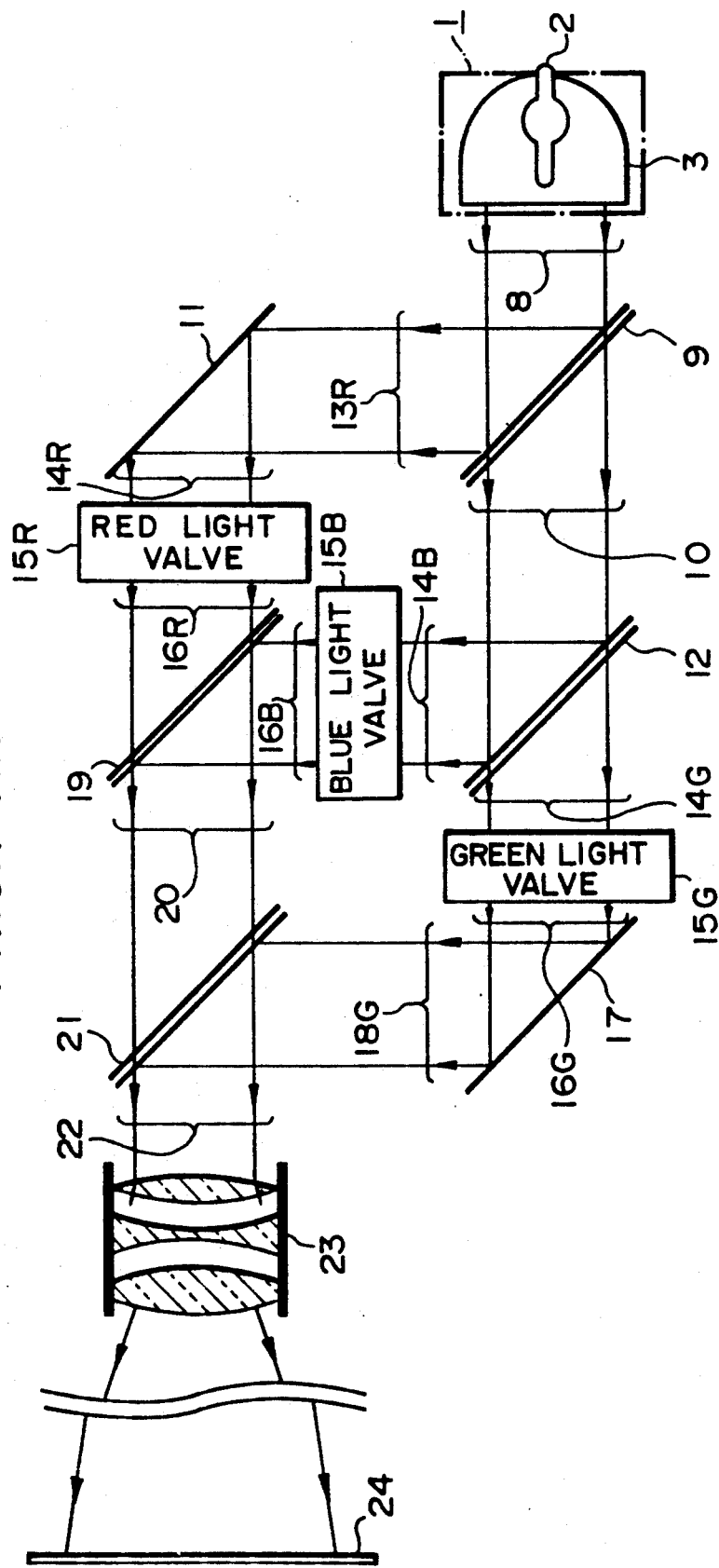
FIG. 1 shows the structure of a conventional color display apparatus.
Figure 2:
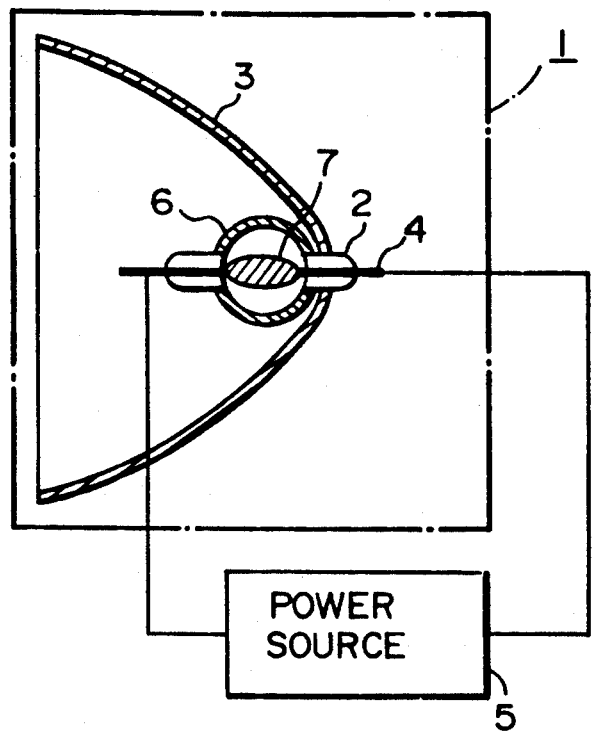
FIG. 2 shows the structure of a conventional light source portion.
Figure 3:
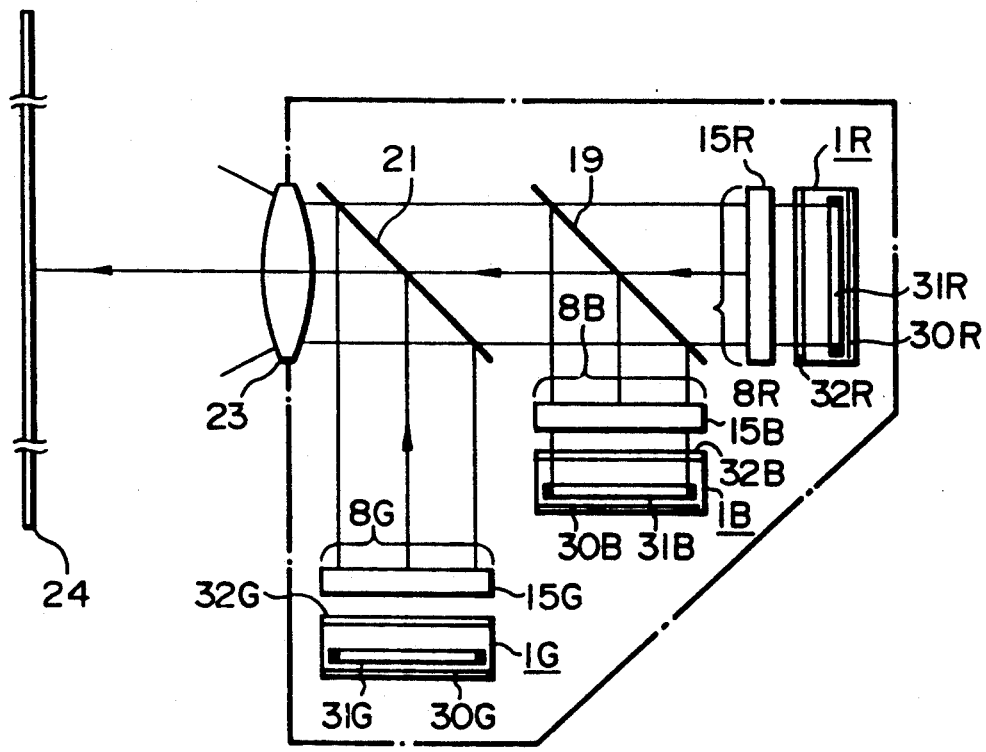
FIG. 3 shows the structure of an embodiment of a projection color display apparatus according to the present invention.

FIG. 3 shows the structure of an embodiment of a projection color display apparatus according to the present invention. In FIG. 3, light source portions 1R, 1G and 1B have three planar light sources 31R, 31G and 31B having the peak wavelengths of red, green and blue, respectively. Planar reflecting mirrors 30R, 30G and 30B are provided behind the respective light sources 31 so as to reflect the light emitted from behind the light sources 31 in the forward direction. The reference numerals 8R, 8G and 8B represent light fluxes emitted from the respective light source portions 1. The light flux 8 emitted from the planar light source 31 has an approximately quadrangular (e.g., rectangular) section which is similar to the section of the light-emitting surface and can be projected on a quadrangular light valve 15 without loss. The light fluxes 8R, 8G and 8B are projected on the light valves 15R, 15G and 15B which correspond to the respective colors, and after they are synthesized by dichroic mirrors 19, 21, which are synthetic optical systems, they are projected on the screen 24 by the projection lens 23 so as to form the images on the light valves as an enlarged and synthesized image. Although the planar reflecting mirrors 30R, 30G and 30B are used for reflecting the light emitted from behind the light sources 31 in the forward direction in this embodiment, it is also possible to reflect the light emitted from behind the light sources in the forward direction by coating the inner surface of the outer wall of the light source portion 1 with a metal. As the light sources 31R, 31G and 31B, fluorescent discharge tubes, for example, may be used. FIG. 4 is an enlarged view of an example of a light source portion 1, wherein FIG. 4A is a side elevational view and FIG. 4B is a front elevational view thereof. As shown in FIG. 4B, several linear tubes 31 are arranged and light emitted from the linear tubes 31 are transmitted through a diffusion plate 33 as a planar light source. As the diffusion plate 33, a plate which refracts light irregularly such as ground glass is suitable. FIG. 5A is a side elevational view of another example of the light source portion 1 and FIG. 5B is a front elevational view thereof. In this example, the light source 31 is a U-shaped curved tube. A fluorescent discharge tube can produce spectral characteristics which are close to a monochromatic light spectrum. The light source 31 may be other than a fluorescent discharge tube. For example, a three-color light source may be constituted by a white light source such as a halogen lamp and metal-halide lamp and color filters for transmitting the light emitted from the white light source may be provided. Alternatively, a cathode ray tube or a planar CRT using the light emission property of a phosphor, or planar light sources for the respective colors using EL (electroluminescence) elements may be used.

The light source portions 1 have optical interference filters 32R, 32G and 32B on the light emitting surfaces so as to only transmit the light flux components which are approximately perpendicular to the light emitting surfaces, from among the light fluxes emitted from the respective light sources 31R, 31G and 31B and having the respective peak wavelengths.

Figure 7A:
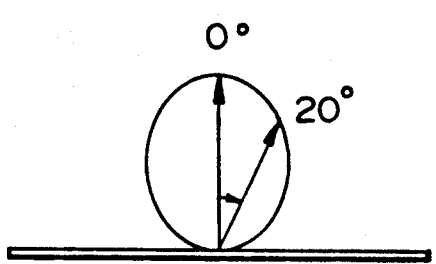
FIG. 7(a) shows the directionality of light emitted with no optical interference filter and FIG. 7(b) shows directionality of the light emitted from the optical interference filter in the embodiment shown in FIG. 3.
Figure 7B:
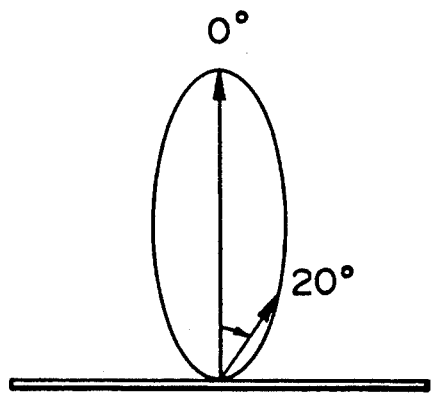

The transmission spectral characteristics of the optical interference filter 32G in the green light source 31G is shown in FIG. 6 as an example. An example of the emission spectrum of the light source is also shown in FIG. 6. The optical interference filter 32G has a function of a high pass filter for transmitting light having a short wavelength, and is so designed as to transmit approximately 100% of the light having the peak wavelength emitted from the light source 31G when the filter incident angle ($\theta$) is 0°. The filter incident angle ($\theta$) is an angle with respect to the line which is perpendicular to the filter surface. When the incident angle is not 0° ($\theta = 10°, 20°$ in FIG. 6), the function of a low pass filter acts toward a short wavelength, thereby greatly deteriorating the transmittance of the light having the peak wavelength emitted from the light source 31G. In other words, the light flux is reflected and the reflected light is returned to the light source 31G. Among the light fluxes which are reflected irregularly within the light source 31G and the light fluxes which are reflected by the reflecting mirror 30, only the light flux which reenters perpendicularly to the filter is transmitted and emitted. As a result, the distribution of the emitted light which has no directionality without a filter, as shown in FIG. 7A, has a strong directionality by providing a filter, as shown in FIG. 7B and only the light flux component which is approximately perpendicular is emitted. Consequently, the light flux emitted from the light source 31G becomes an approximately parallel light flux and is projected to the light valve 15 with a high efficiency.

Furthermore, since the light is gathered in the perpendicular direction, as shown in FIG. 7B, the quantity of light in the direction of $\theta=0°$ is increased by at least a factor of two. In this way, by utilizing the optical interference filter 32G, it is possible not only to project the light flux emitted from the light source portion 1 on the light valve 15 with high efficiency but also to greatly enhance the utilization efficiency of the light flux emitted from the light source itself.

In order to heighten the above-described effects, it is preferable to bring the light source portion 1 as close to the light valve 15 as possible. This is easy to realize because the light source portion 1 has a flat surface and is provided with the respective color light sources. It is also possible to provide a condenser lens between the light source portion 1 and the light valve 15.

It is possible to greatly reduce the size of the apparatus of this embodiment because it obviates a optical separation system in spite of the increase in the number of light source portions.

Figure 8:
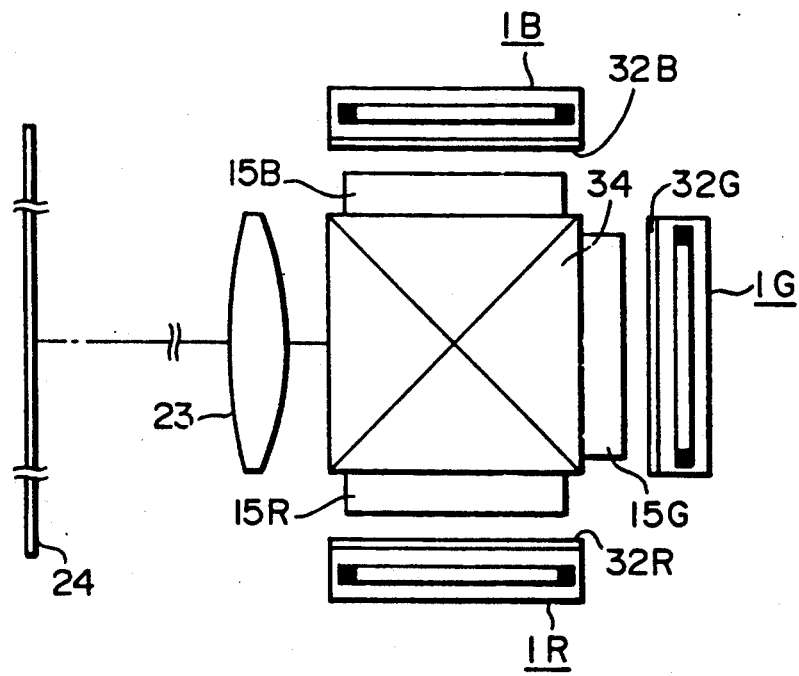
FIG. 8 shows the structure of another embodiment using a light synthesizer having another structure.

Another embodiment of the present invention is shown in FIG. 8. In this embodiment, a dichroic prism 34 is used as an optical synthetic system, thereby making the entire structure more compact.

The optical interference filter 32 has a function of removing the light having a long wavelength from the light emitted from the light source which has unnecessary wavelengths, as shown in FIG. 6, and enhances the color reproducibility of the projected image.

In the above embodiments, only the green light source 1G is described, but the same is applied to the red and blue light sources 1R and 1B.

The optical interference filter 32 comprises, for example, a multi-layered film composed of alternately laminated high-refractive-index material such as $TiO_2$ and $Ta_2O_5$ and low-refractive-index material such as $SiO_2$ and $MgF_2$. The above-described effects can be sufficiently attained by not less than a five-layered film.

Figure 9:
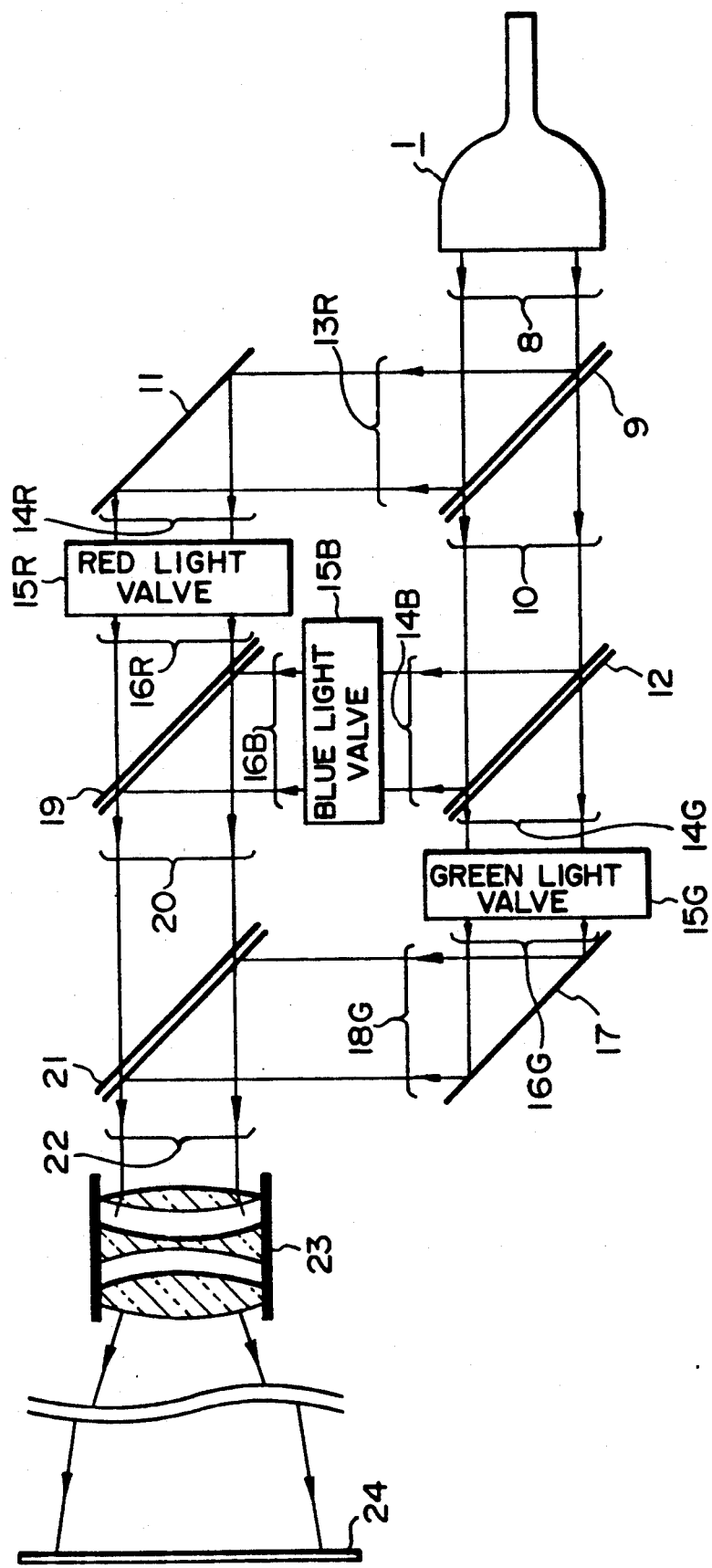
FIG. 9 shows the structure of still another embodiment of a projection color display apparatus according to the present invention.
Figure 10:
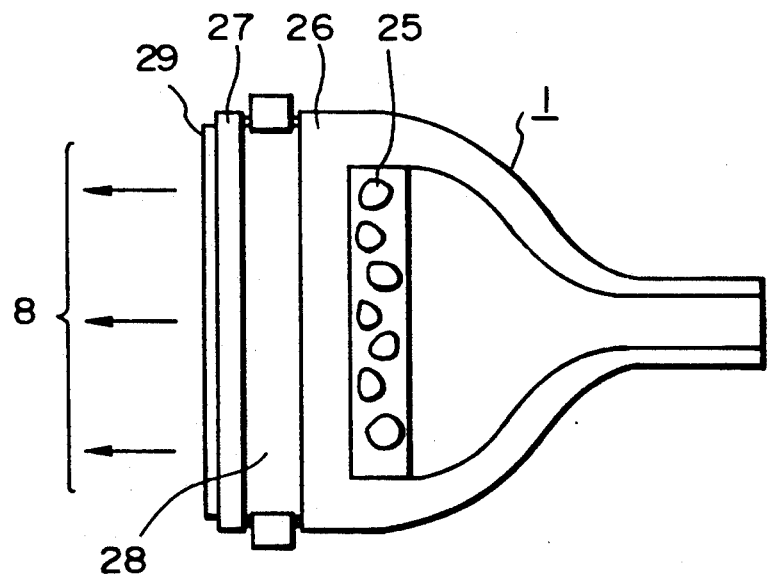
FIG. 10 shows the structure of an example of a light source portion in the embodiment shown in FIG. 9.

FIG. 9 shows the structure of still another embodiment of a projection color display apparatus according to the present invention, and FIG. 10 is an enlarged view of the light source portion 1 thereof. The light source portion 1 is composed of a CRT light source which has a mixture of three kinds of phosphors 25 having red, green and blue peak wavelengths. A coolant 28 is sealed between a face plate 26 and a glass plate 27 of the CRT. The reference numeral 8 represents a light flux emitted from the light source portion 1. The light-emitting surface of the light source portion 1 has a flat shape and the light flux 8 emitted therefrom has an approximately quadrangular shape similar to that of the light valve 15. It is therefore possible to project the light flux 8 on the light valve 15 without loss. The light flux 8 is separated into light fluxes of the three colors and projected to the light valves 15R, 15G and 15B which correspond to the respective colors, synthesized by the dichroic mirrors 19, 21 and projected on the screen by the projection lens 23 so as to form an enlarged image in the same way as in the prior art. The life of the CRT light source is about 10,000 hours, which is much longer than the life (1,000 to 2,000 hours) of a conventional metal-halide lamp, thereby enabling the life of the apparatus to a greatly prolonged.

General CRT phosphors emit light in all directions with approximately the same intensity. Since the light is not a parallel light flux, the utilization efficiency of the light flux is greatly lowered, as described above. In contrast, the CRT light source portion 1 in this embodiment is provided with an optical interference filter 29 on the glass plate 27, which is a light-emitting surface, so as to only transmit the light flux component which is approximately perpendicular to the light-emitting surface.

Figure 11:
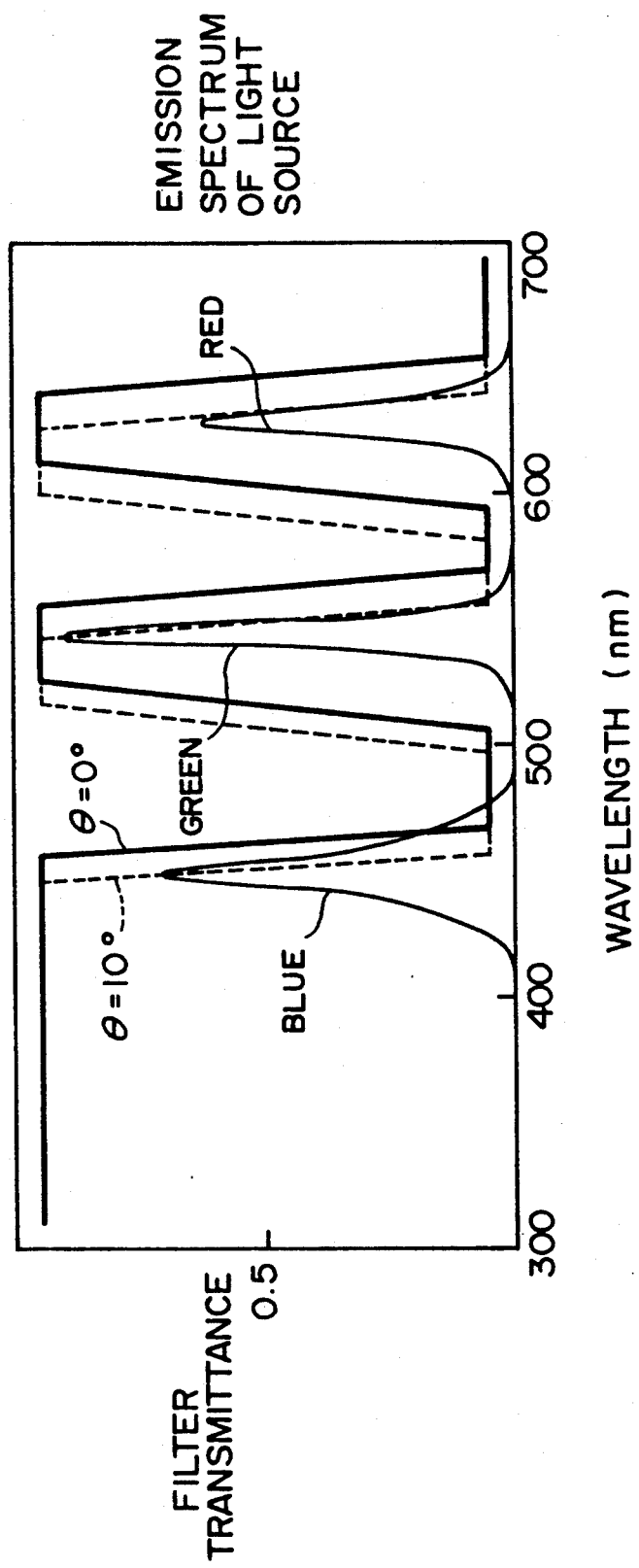
FIG. 11 shows the spectral characteristics of the optical interference filter in the embodiment shown in FIG. 9.
Figure 12A:
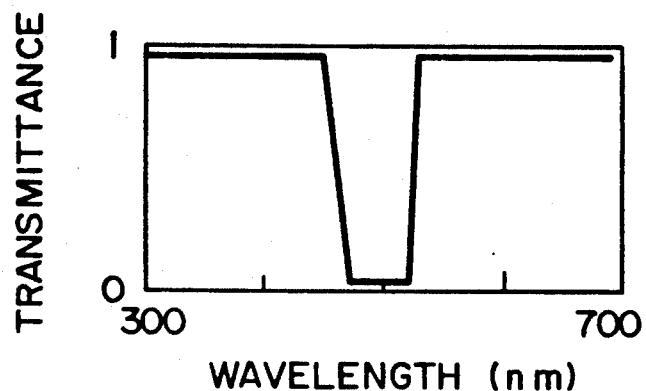
FIG. 12(a), (b), and (c) show the spectral characteristics of the three optical interference filters necessary to generate the spectral characteristics shown in FIG. 11.
Figure 12B:
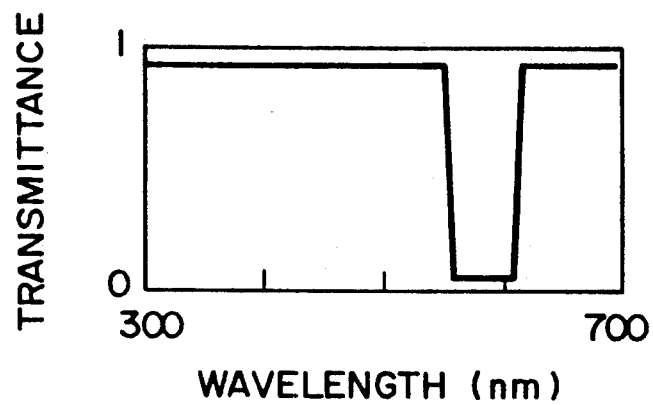

The transmission spectral characteristics of the optical interference filter in the light source portion 1 is shown in FIG. 11. As example of the emission spectrum of the light source is also shown in FIG. 11. The optical interference filter has a function of a band pass filter with respect to the light having the three peak wavelengths of the phosphors, and is so designed so as to transmit approximately 100% of the light having the three peak wavelengths emitted from the light source when the filter incident angle ($\theta$) is 0°. When the incident angle is not 0° ($\theta=10°$ in FIG. 11), the spectral characteristics act toward a short wavelength, thereby greatly deteriorating the transmittance of the light having the peak wavelength emitted from the light source. In other words, the light flux is reflected and the reflected light is returned to the phosphors. Among the light fluxes which are reflected irregularly, only the light flux which reenters perpendicularly to the filter is transmitted and emitted. As a result, the distribution of the emitted light which has no directionality without a filter, as shown in FIG. 12A, has a strong directionality by providing a filter, as shown in FIG. 12B and only the light flux component which is approximately perpendicular is emitted. Consequently, the light flux emitted from the light source 31 becomes an approximate parallel light flux and is projected to the light valve 15 with a high efficiency.

Furthermore, since the light is gathered in the perpendicular direction, as shown in FIG. 12B, the quantity of light in the direction of $\theta=0°$ is by at least a factor of two increased. In this way, the optical interference filter in this embodiment is capable of converting the light flux emitted from the light source into a parallel light flux and since the section of the light flux has a quadrangular shape, it is possible to project the light flux onto the light valve with high efficiency. The optical interference filter in this embodiment comprises, for example, a multi-layered film composed of alternately laminated high-refractive-index material such as $TiO_2$ and $Ta_2O_5$ and low -refractive-index material such as $SiO_2$ and $MgF_2$.

Although the optical interference filter 29 is provided only on the light-emitting side of the glass plate 27 in this embodiment, and optical interference filters may be provided on both sides of the glass plate 27 or further on the light-emitting surface of the face plate.

Figure 12C:
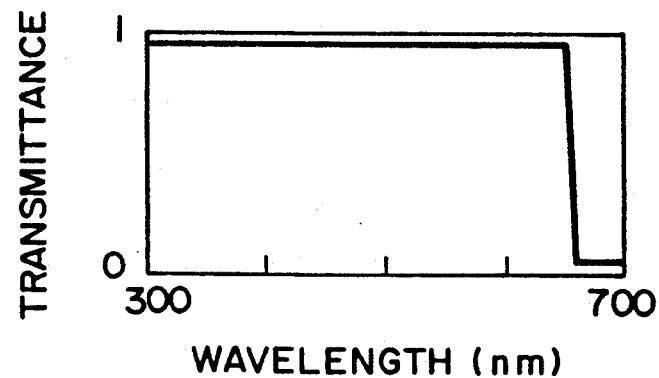

For example, the spectral characteristics shown in FIG. 11 are obtained by using three optical interference filters having the respective spectral characteristics shown in FIGS. 12A, 12B and 12C.

Figure 13:
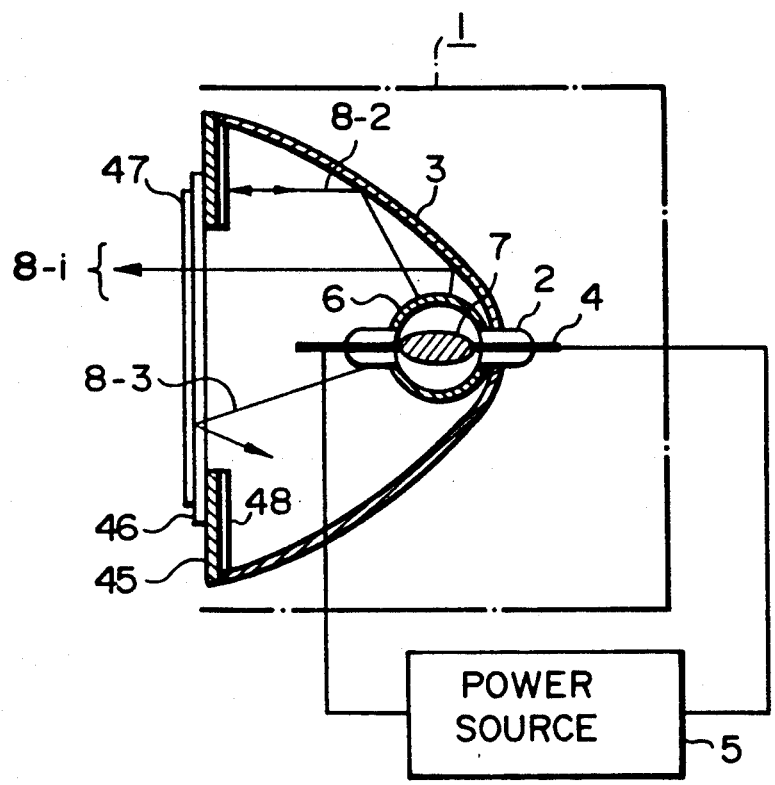
FIG. 13 shows the structure of another example of a light source portion in the embodiment shown in FIG. 9.
Figure 14:
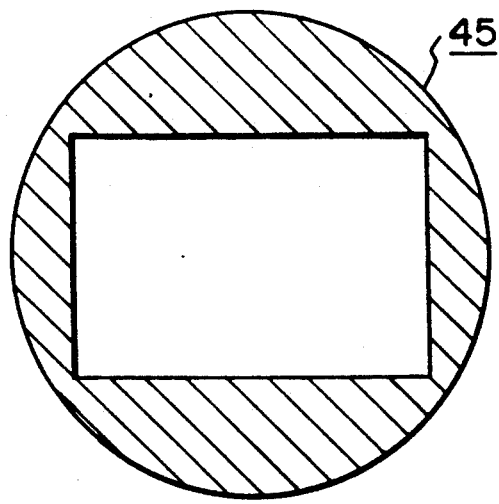
FIG. 14 shows the light-emitting aperture of the light source portion in the embodiment shown in FIG. 9.

FIG. 13 is an enlarged view of another example of the light source portion 1. In this example, the light source portion 1 is a metal-halide lamp having three peak wavelengths of red, green and blue. On the light-emitting portion of the light source portion 1 are provided a light emission regulator 45 and a glass plate 46 with an optical interference filter 47 provided on the surface thereof.

The operation of the light source portion 1 will be explained.

The light transmitting portion of the light emission regulator 45 has a quadrangular shape similar to that of the light valve 15. The section of the light flux 8-1 emitted in parallel from the light source portion 1 has an approximately the same shape as the light valve 15.

Among the light fluxes emitted from the light-emitting portion 7, the light flux 8-2 which enters the non-transmitting portion of the light emission regulator 45 is reflected by a reflecting means 48 such as an aluminum coat provided on the inner surface of the light emission regulator 45 and returned to the inside of the light source portion 1. The light flux 8-3 which obliquely enters the light emitting aperture is reflected by the optical interference filter 47 and returned to the inside of the light source portion 1.

By using this light source portion, it is also possible to obtain a projection color display apparatus similar to the embodiment shown in FIG. 9.

While there has been described what is at present considered to be preferred embodiments of the invention, it will be understood that various modifications may be made thereto, and it is intended that the appended claims cover all such modifications as fall within the true spirit and scope of the invention.

What is claimed is:

1. A projection color display apparatus for projecting a color image on a screen comprising:
    a plurality of light sources having planar light-flux-emitting portions for emitting a plurality of light source fluxes;
    a plurality of optical interference filters provided on the light-flux-emitting portion of each of said plurality of light sources for emitting a plurality of light fluxes perpendicular to a surface of said planar light-flux-emitting portions;
    a plurality of light valves disposed in a path of each of the plurality of light fluxes emitted by said plurality of light sources so as to modulate the plurality of light fluxes in two dimensions; and
    an optical synthetic system for synthesizing the modulated plurality of light fluxes into one combined light flux.

2. The projection color display apparatus of claim 1, wherein said plurality of light sources are red, blue and green light sources.

3. The projection color display apparatus of claim 2, wherein said plurality of optical interference filters are short wavelength pass filters, which only transmit a main peak wavelength light flux of each of said plurality of light sources, such as, red light, blue light, and green light.

4. The projection color display apparatus of claim 1, wherein each of said plurality of light sources includes a plurality of linear light-emitting tubes, a reflecting mirror disposed behind said plurality of light-emitting tubes and a diffusion plate disposed in front of said plurality of light-emitting tubes.

5. The projection color display apparatus of claim 1, wherein each of said plurality of light sources includes a curved light-emitting tube, a reflecting mirror disposed behind said curved light-emitting tube, and a diffusion plate disposed in front of said curved light-emitting tube.

6. The projection color display apparatus of claim 1, wherein said optical synthetic system includes a plurality of dichroic mirrors.

7. The projection color display apparatus of claim 1, wherein said optical synthetic system includes a dichroic prism.

8. The projection color display apparatus of claim 1, wherein the light-flux-emitting portions of said plurality of light sources are quadrangular in shape.

9. A projection color display apparatus for projecting a color image on a screen comprising:
    a white light source for emitting a white light flux;
    an optical separation system for separating the white light flux emitted from said white light source into three light fluxes of different colors;
    a plurality of light valves disposed in a path of the three light fluxes for modulating the three light fluxes in two dimensions; and
    an optical synthetic system for synthesizing the modulated three light fluxes into one combined light flux;
    said white light source including a light-flux-emitting portion which has approximately the same shape as each of said plurality of light valves and which is provided with an optical interference filter for emitting the white light flux in a direction perpendicular to a light-emitting surface provided with the optical interference filter.

10. The projection color display apparatus of claim 9, wherein said white light source is a cathode ray tube (CRT).

11. The projection color display apparatus of claim 9, wherein said optical separation system and said optical synthetic system include a plurality of dichroic mirrors.

12. The projection color display apparatus of claim 9, wherein said optical interference filter is a three part band pass filter which transmits red light, blue light and green light.

13. The projection color display apparatus of claim 9, wherein the light-flux-emitting portion of said white light source is quadrangular in shape.

14. The projection color display apparatus of claim 9, wherein said white light source further includes a light-flux-emitting portion,
    a parabolic reflecting mirror disposed behind said light-flux-emitting portion, and
    a light emission regulator provided between said light-flux-emitting portion and said parabolic reflecting mirror, said light emission regulator including reflecting means provided on an inner surface of said light emission regulator, adjacent to said light-flux-emitting portion.

15. The projection color display apparatus of according claim 14, wherein said optical separation system and said optical synthetic system include a plurality of dichroic mirrors.

16. The projection color display apparatus of claim 14, wherein said optical interference filter is a three part band pass filter which transmits red light, blue light and green light.

17. The projection color display apparatus of claim 14, wherein the light-flux-emitting portion of said white light source is quadrangular in shape.

18. The projection color display apparatus of claim 9, wherein the white light source is a halogen lamp.

19. The projection color display apparatus of claim 9, wherein the white light source is a metal-halide lamp.

20. The projection color display apparatus of claim 9 wherein the white light source is a monochrome CRT.

21. The projection color display apparatus of claim 14, wherein the white light source is a halogen lamp.

22. The projection color display apparatus of claim 14, wherein the white light source is a metal-halide lamp.

23. The projection color display apparatus of claim 14, wherein the white light source is a monochrome CRT.

24. The projection color display apparatus of claim 1, wherein said plurality of light sources are monochrome CRTs.

25. A projection color display apparatus comprising:
a plurality of light source means for emitting a plurality of parallel luminous fluxes;
a plurality of light valves, each receiving one of said plurality of parallel luminous fluxes, for modulating an intensity of the received one of the plurality of parallel luminous fluxes in two dimensions;
a optical synthetic system for synthesizing the modulated plurality of parallel luminous fluxes into a two-dimensional color image; and
a projection lens for magnifying the two-dimensional color images and projecting the magnified two-dimensional color image on a screen;
each of said plurality of light source means including,
a planar light source for emitting a planar light flux in a direction of one of said plurality of light valves,
planar reflecting means for reflecting an additional light flux in the direct of one of said plurality of light valves, and
an optical interference filter including a light emitting surface for receiving and filtering the planar light flux and the additional light flux to form said parallel luminous flux perpendicular to the light emitting surface of said optical interference filter.

26. The projection color display apparatus of claim 25, wherein said plurality of light source means are red, blue, and green light source means.

27. The projection color display apparatus of claim 26, wherein said optical interference filter is a short wavelength pass filter, which only transmits a main peak wavelength light flux of each of said plurality of light source means, such as, red light, green light, or blue light.

28. The projection color display apparatus of claim 25, wherein each of said plurality of light source means and a corresponding one of said plurality of light valves are positioned as close as possible, thereby minimizing the dimensions of said projection color display apparatus.

29. The projection color display apparatus of claim 25, wherein a condenser lens is positioned between each of said plurality of light source means and a corresponding one of said plurality of light valves.

30. The projection color display apparatus of claim 25, wherein said planar light source includes a planar light source aperture through which the planar light flux is emitted and each of said plurality of light valves includes a light receiving surface for receiving one of said plurality of parallel luminous fluxes, wherein the planar light source aperture, the light receiving surface, and the light emitting surface of said optical interference filter are all of a similar quadrangular shape.

31. The projection color display apparatus of claim 30, wherein said planar light source further includes at least one fluorescent discharge tube and a diffusion plate for producing a monochromatic light spectrum.

32. The projection color display apparatus of claim 31, where said at least one fluorescent discharge tube is a linear fluorescent discharge tube.

33. The projection color display apparatus of claim 31, wherein said at least one fluorescent discharge tube is a curved fluorescent discharge tube.

34. The projection color display apparatus of claim 31, wherein said diffusion plate is composed of ground glass.

35. The projection color display apparatus of claim 25, said planar reflecting means including a planar reflecting mirror positioned such that said planar light source is between the planar reflecting mirror and said optical interference filter.

36. The projection color display apparatus of claim 25, wherein said planar reflecting means includes a metal coating on said planar light source.

37. The projection color display apparatus of claim 25, wherein said optical synthetic system includes a plurality of dichroic mirrors.

38. The projection color display apparatus of claim 25, wherein said optical synthetic system includes a dichroic prism.

39. The projection color display apparatus of claim 25, wherein said optical interference filter is a multilayered film including a high refractive-index material layer and a low refractive-index material layer.

40. A projection color display apparatus comprising:
white light source means for emitting a white parallel luminous flux;
an optical separation system for separating the white parallel luminous flux into a plurality of colored parallel luminous fluxes;
a plurality of light valves, each receiving one of said plurality of colored parallel luminous fluxes, for modulating an intensity of the received on of the plurality of colored parallel luminous fluxes in two dimensions;
an optical synthetic system for synthesizing the modulated plurality of colored parallel luminous fluxes into a two-dimensional color image; and
a projection lens for magnifying the two-dimensional color image and projecting the magnified two-dimensional color image on a screen;
said white light source means including,
a cathode ray tube light source means for emitting a white light flux in a direction of one of said plurality of light valves, and
an optical interference filter including a light emitting surface for receiving and filtering the white light flux to form said white parallel luminous flux and emitting the white parallel luminous flux perpendicular to the light emitting surface of said optical interference filter.

41. The projection color display apparatus of claim 40, where the plurality of colored parallel luminous fluxes are red, blue, and green parallel luminous fluxes.

42. The projection color display apparatus of claim 41, wherein said optical interference filter is a three part band pass filter which transmits red light, green light, and blue light.

43. The projection color display apparatus of claim 40, wherein said white light source means is a halogen lamp.

44. The projection color display apparatus of claim 40, wherein said white light source means is a metal-halide lamp.

45. The projection color display apparatus of claim 40, wherein said white light source means is a monochrome CRT.

46. The projection color display apparatus of claim 40, wherein said cathode ray tube light source means includes a light source aperture through which the white light flux is emitted and each of said plurality of light valves includes a light receiving surface for receiving one of said plurality of colored parallel luminous fluxes, wherein the light source aperture, the light receiving surface, and the light emitting surface of said optical interference filter are all of a similar quadrangular shape.

47. The projection color display apparatus of claim 46, wherein said cathode ray tube light source means further includes a face plate and grass plate with a coolant sealed therebetween.

48. The projection color display apparatus of claim 46, wherein said cathode ray tube light source means further includes,
   a parabolic reflecting mirror positioned behind the light source aperture, and
   a light source emission regulator, positioned in front of the light source aperture, including reflecting means provided on an inner surface of said light source emission regulator, adjacent to the light source aperture.

49. The projection color display apparatus of claim 46, wherein said white light source means is a halogen lamp.

50. The projection color display apparatus of claim 46, wherein the white light source means is a metal-halide lamp.

51. The projection color display apparatus of claim 46, wherein said white light source means is a monochrome CRT.

52. The projection color display apparatus of claim 40, wherein said optical synthetic system includes a plurality of dichroic mirrors.

53. The projection color display apparatus of claim 40, wherein said optical synthetic system includes a dichroic prism.

54. The projection color display apparatus of claim 40, wherein said optical interference filter is a multilayered film including a high refractive-index material layer and a lower refractive-index material layer.

* * * * *